United States Patent
Lim

(10) Patent No.: US 7,511,859 B2
(45) Date of Patent: Mar. 31, 2009

(54) MOBILE TERMINAL HAVING CAMERA FOR INSERTING WATERMARK DATA INTO IMAGE DATA AND METHOD THEREOF

(75) Inventor: Joon-Hee Lim, Kyoungki-do (KR)

(73) Assignee: Pantech&Curitel Communications, Inc., Seoul (KR)

(*) Notice: Subject to any disclaimer, the term of this patent is extended or adjusted under 35 U.S.C. 154(b) by 940 days.

(21) Appl. No.: 10/960,313

(22) Filed: Oct. 6, 2004

(65) Prior Publication Data
US 2005/0073725 A1    Apr. 7, 2005

(30) Foreign Application Priority Data
Oct. 7, 2003    (KR) .................. 10-2003-0069677

(51) Int. Cl.
*G06K 15/00*    (2006.01)
*H04N 1/40*    (2006.01)
*G06F 3/12*    (2006.01)

(52) U.S. Cl. ..................... 358/3.28; 358/1.15
(58) Field of Classification Search ............... 358/1.15, 358/3.28, 3.27
See application file for complete search history.

(56) References Cited

U.S. PATENT DOCUMENTS 7,209,571 B2 *    4/2007    Davis et al. .................. 382/100

FOREIGN PATENT DOCUMENTS

JP    2003-134038    5/2003

* cited by examiner

*Primary Examiner*—Douglas Q Tran
(74) *Attorney, Agent, or Firm*—H.C. Park & Associates, PLC

(57) ABSTRACT

The mobile terminal for inserting watermarking data into image data and the method thereof are disclosed. The mobile terminal includes a first storage for storing watermark data of an image; a camera module for obtaining an image and converting the image into an analog electric image data; an image data encoder for encoding the analog electric image data into digital image data and inserting the watermark data stored in the first memory into the digital image data; a second storage for storing the encoded image data having the watermark data of the image; and a controller for controlling the image data encoder to encode the image data obtained through the camera module with inserting the watermark data of the image data stored in the first storage.

4 Claims, 3 Drawing Sheets

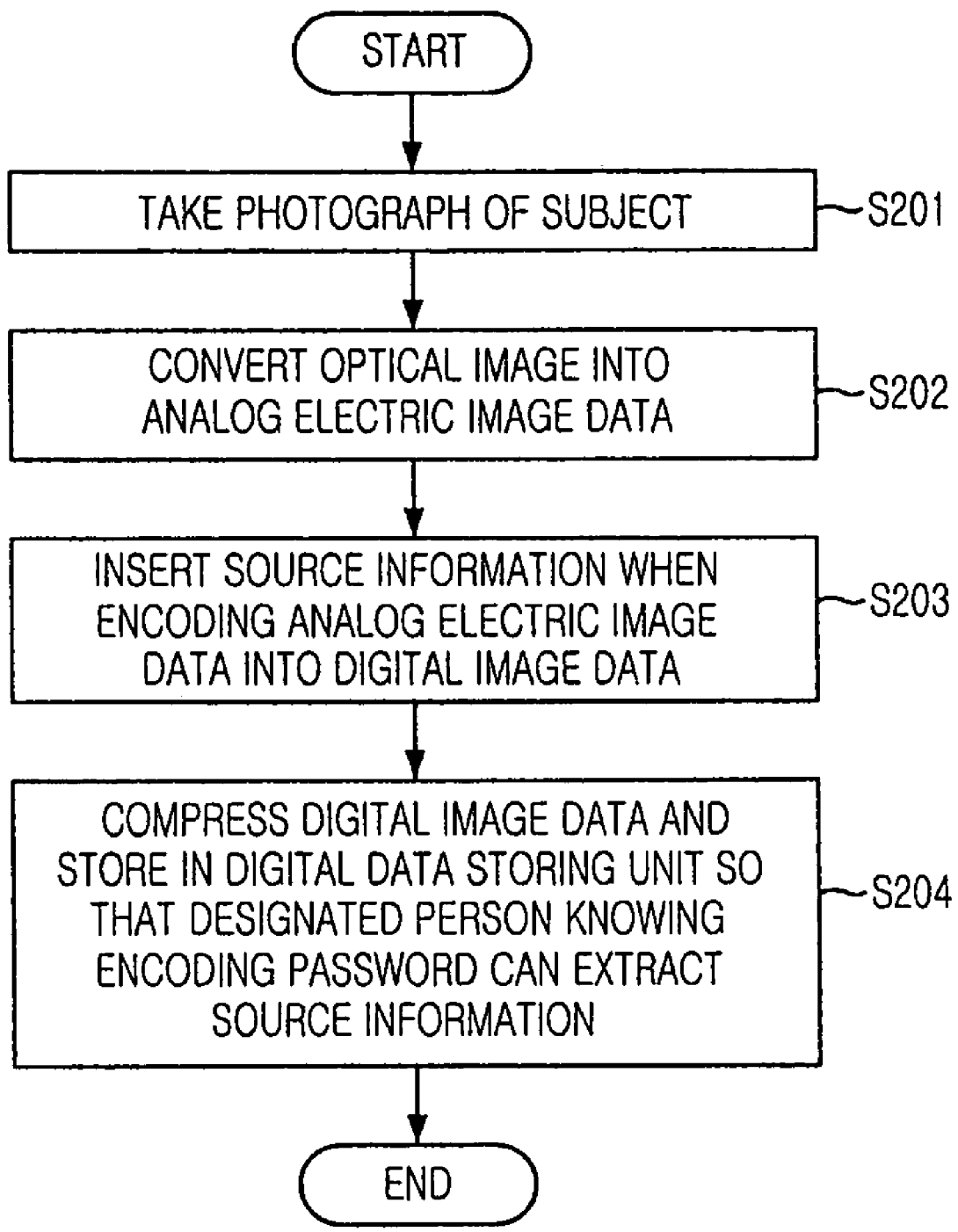

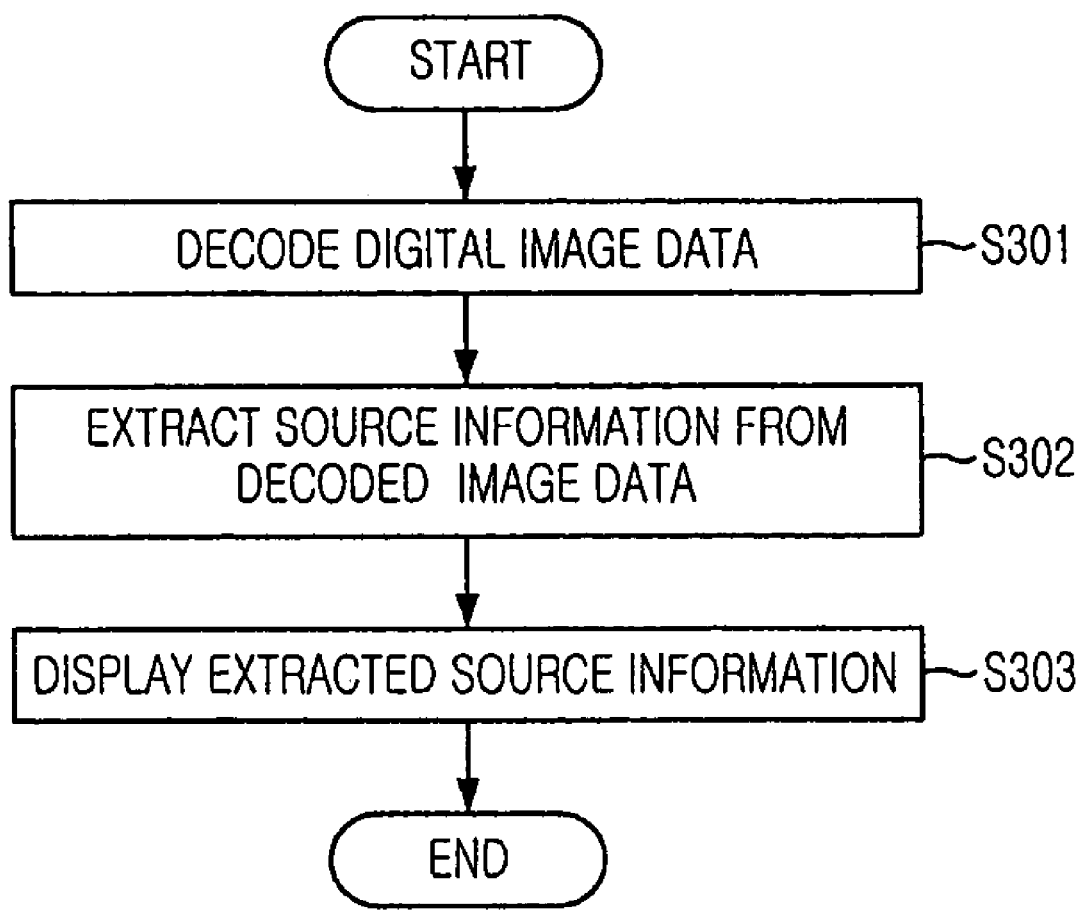

MOBILE TERMINAL HAVING CAMERA FOR INSERTING WATERMARK DATA INTO IMAGE DATA AND METHOD THEREOF

CROSS REFERENCE TO RELATED APPLICATION

This application claims priority from and the benefit of Korean Patent Application No. 2003-69677, filed on Oct. 7, 2003, which is hereby incorporated by reference for all purposes as if fully set forth herein.

FIELD OF THE INVENTION

The present invention relates to a mobile terminal having a camera for inserting watermark data into image data and a method thereof; and, more particularly, to a mobile terminal provided with a camera for inserting watermark data into image data, e.g., electronic serial number (ESN) of the mobile terminal in order to identify the source of a photograph when the image data photographed by a camera built in the mobile terminal is decoded.

DESCRIPTION OF RELATED ART

Hereinafter, a mobile terminal refers to a portable wireless telecommunication terminal that can transmit/receive a voice, a text and image data, for example, a personal communication service (PCS) terminal, a personal digital assistant (PDA), a smart phone, an international mobile telecommunication 2000 (IMT-2000) terminal, a wireless local area network (LAN) terminal through a wireless telecommunication network. The mobile terminal having a camera will be described in accordance with a preferred embodiment of the present invention.

The mobile terminal has many merits, including mobility provided to a user. Due to the mobility, the number of subscribers of a wireless telecommunication service increases the number of people currently using the mobile terminals.

As the number of users of mobile terminals increases, the user expects more additional functions of the mobile terminal. According to the expectation, a new and popular concept mobile terminal on the market is a mobile terminal having camera functions.

However, misuse and abuse of the camera phone are a problem of the society. The problem is that the camera phone is used secretly and illegally in such as a bathhouse, a locker room or a swimming pool. Therefore, to regulate illegal usage of the camera phone, the mobile terminal may have an informing function that notifies others that a picture is being taken. The informing function may include emitting sounds or flashes when the user takes a picture of a subject in order to inform the subject whose photograph is taken.

The present invention provides a method for efficiently preventing an illegal photographing by inserting the source information of the image data.

SUMMARY OF THE INVENTION

It is, therefore, an object of the present invention to provide a mobile terminal for inserting watermark data into image data in order to identify the source of the photograph when the image data photographed by a camera built in the mobile terminal is decoded.

In accordance with an aspect of the present invention, there is provided a mobile terminal having a camera for inserting watermark data into image data, the mobile terminal including: a first storage for storing watermark data; a camera module for obtaining an image and converting the image into analog electric image data; an image data encoder for encoding the analog electric image data into digital image data and inserting the watermark data stored in the first memory into the digital image data to thereby generate encoded image data; a second storage for storing the encoded image data having the watermark data.

In accordance with another aspect of the present invention, there is provided a method for inserting watermark data into image data, the method including the steps of: obtaining an image of a subject and converting the obtained image into analog electric image data; encoding the analog electric image data into digital image data and inserting watermark data into the digital image data; and storing the digital image data having the watermark data of the image in order to extract and identify the watermark from the digital image data having the source information of the image by designated person.

BRIEF DESCRIPTION OF THE DRAWINGS

The above and other objects and features of the present invention will become apparent from the following description of the preferred embodiments given in conjunction with the accompanying drawings, in which:

FIG. 2 is a flowchart describing a method for inserting watermark data into image data in accordance with a preferred embodiment of the present invention; and FIG. 3 is a flowchart describing a method for extracting watermark data from image data in accordance with a preferred embodiment of the present invention.

DETAILED DESCRIPTION OF THE INVENTION

Figure 1:
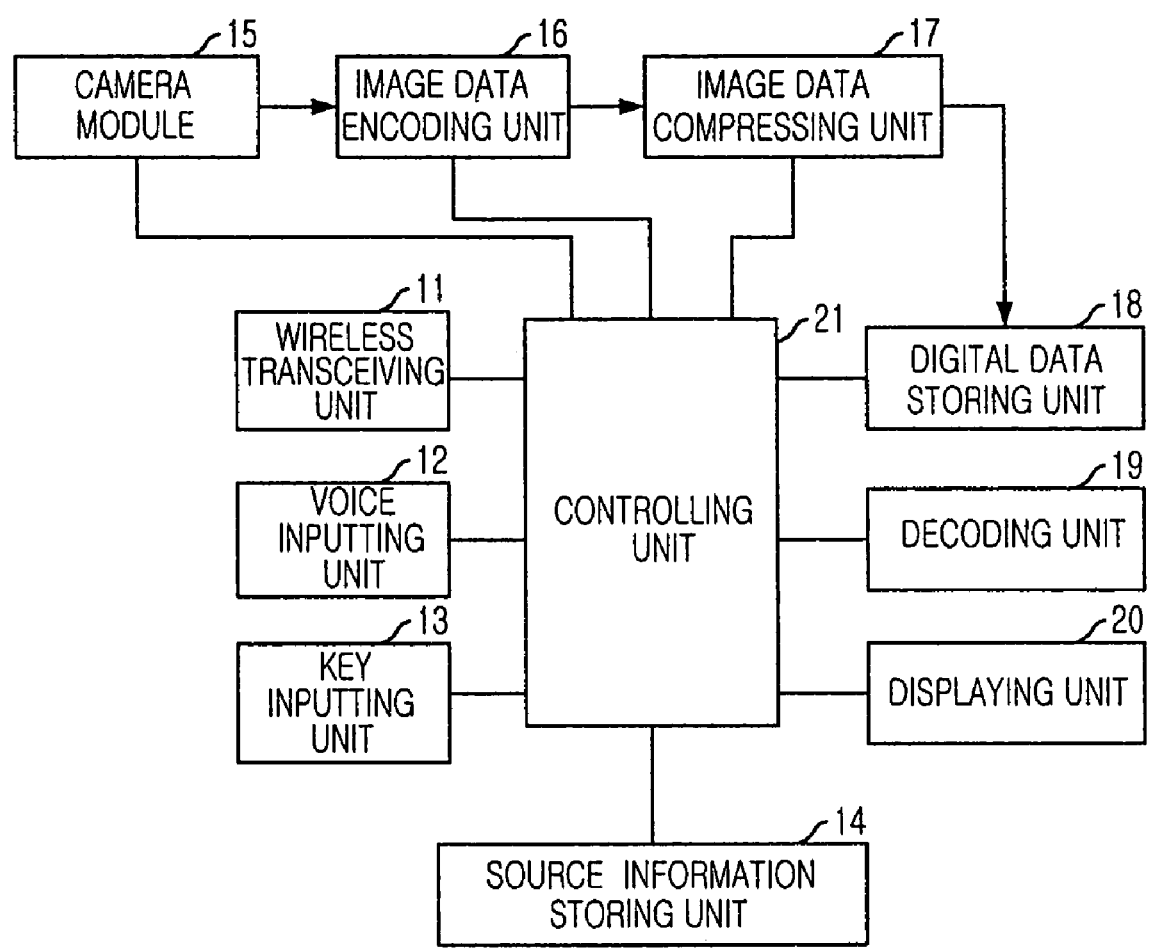
FIG. 1 is a block diagram showing a mobile terminal provided with a camera for inserting watermark data into image data in accordance with a preferred embodiment of the present invention.

Hereinafter, the mobile terminal provided with a camera for inserting watermark data into image data will be described in detail with reference to the accompanying drawings.

FIG. 1 is a block diagram showing a mobile terminal provided with a camera for inserting watermark data into image data in accordance with a preferred embodiment of the present invention.

As shown, the mobile terminal for inserting the watermark data into the image data includes a wireless transceiving unit 11, a voice inputting unit 12, a key inputting unit 13, a source information storing unit 14, a camera module 15, a image data encoding unit 16, an image data compressing unit 17, a digital data-storing unit 18, a decoding unit 19, a displaying unit 20 and a controlling unit 21.

In this embodiment, source information of the image data, e.g., a phone number or an electronic serial number (ESN) of the mobile terminal having the camera is used as the watermark data.

The wireless transceiver 11 transmits/receives a data to/from other mobile terminal in wireless through a base station (not shown).

The voice inputting unit 12, e.g., microphone receives voice data.

The key inputting unit 13 has various function keys and numeric keys and receives information such as a phone number and personal information to the mobile terminal, and in particular, has function keys used to control a built-in camera.

The source information storing unit 14 stores the source information of the image data.

The camera module 15 obtains an optical image and converts the optical image into analog electric image data. Wherein, the electric signal outputted from the camera module 15 is an analog signal, and a device that converts an optical signal into an electric signal, e.g., a complimentary metal-oxide semiconductor (CMOS) image sensor, or a charge coupled device (CCD), is used as the camera module 15.

The image data encoding unit 16 encodes the analog electric image data into a digital image data and inserts the source information stored in the source information storing unit 14 into the image data when the analog electric image data is encoded into the digital image data.

The image data compressing unit 17 compresses the digital image data and generates digital data (i.e., encoded bit stream). A wavelet, a joint photographic coding experts group (JPEG) or a moving picture experts group (MPEG), fractal transform is used for compressing the image data. Hereby, the compression function of the digital image data is an additional function of the present invention in order to increase storing rate of the digital data storing unit 18 by decreasing stored digital data quantity.

The digital data storing unit 18 stores the digital data generated in the image data compressing unit 17.

The decoding unit 19 decompresses the compressed digital data and restores into the analog electric image data.

The displaying unit 20 displays the decoded image data or other data.

The controlling unit 21 controls the image data encoding unit 16 to insert the source information stored in the source information storing unit 14 into the image data when the analog electric image data is encoded into the digital image data.

Also, the source information that is inserted when the analog electric image data is encoded in the image data encoding unit 16 by the controlling unit 21 does not affect how the obtained image is displayed. The source information is used for identifying the owner of the mobile terminal, who photographed the image by using a specific program, wherein the source information cannot be extracted without the encoding password because the source information is encoded with encryption. Accordingly, if the mobile terminal having the camera is used illegally, a designated party can extract the source information from the image data, to thereby protect the private life.

The owner of the mobile terminal is identified and registered in a database. If the owner of the image capture devices, e.g., a digital camera, a camcorder is identified and registered in a database, the source of the image can be identified by extracting the source information inserted into image data even though the image data is distributed to many and unspecified persons through Internet.

FIG. 2 is a flowchart describing a method for inserting watermark data into image data in accordance with a preferred embodiment of the present invention.

A user of a mobile terminal having a camera (hereinafter, refer to as a camera phone) photographs a subject, e.g., a person, an animal or landscape, by using the camera at step S201. Wherein, a still image or a moving picture of the subject, i.e., an image is obtained by the camera module 15. Then, the camera module 15 converts the obtained image into analog electric image data and transmits them to the image data encoding unit 16 at step S202.

Then, the image data encoding unit 16 encodes the analog electric image data into digital image data, wherein source information (i.e., a phone number or an ESN of the camera phone) stored in the source information storing unit 14 is inserted at step S203. Desirably, the source information is encrypted and inserted in a header of the digital image data. The encrypted source information does not affect how the photographed video is displayed after decoding.

The encoded digital image data is compressed and stored in the digital data storing unit 18 to identify the source of the image data by an authorizer who knows an encoding password at step S204. The authorizer may be a member of a cyber crime investigation squad or an authorized company. If the user attempts to manipulate the source information inserted into the image data, the image data gets damaged. That is the image data cannot be displayed as originally captured.

Hereby, the insertion of the source information of the image data, e.g., personal information of the photographer, is completed.

FIG. 3 is a flowchart describing a method for extracting watermark data from image data in accordance with a preferred embodiment of the present invention.

Digital image data which violates private life or is illegal is decoded by an authorizer who knows an encoding password, e.g., a cyber crime investigation squad and an authorized company at step S301.

The source information is extracted from the decoded image data, wherein the source information is a phone number, an ESN of a mobile terminal which photographs the image data at step S302.

The extracted source information is displayed in order to identify the source of the image data by the authorizer at step S303.

Generally, the encoded data can be decoded with the encoding password.

As mentioned above, the method of the present invention can be embodied as a program and stored in recording media (CD-ROM, RAM, floppy disk, hard disk, magneto-optical disk, etc.) readable by a computer.

The present invention can chase the photographer of an image by inserting the source information, e.g., personal information of the photographer into the image when the image violates private life.

Also, the present invention informs a user whose personal information is stored in an image photographed by the user, to thereby prevent photographing an image that can violate the private life.

The present application contains subject matter related to Korean patent application No. 2003-69677, filed in the Korean Intellectual Property Office on Oct. 7, 2003, the entire contents of which being incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A mobile terminal, comprising:
   a first storage to store watermark data including source information;
   a camera module to obtain an image and to convert the image into analog electric image data;
   an image data encoder to encode the analog electric image data into digital image data and to insert the watermark data stored in the first storage into the digital image data to generate encoded image data;
   a second storage to store the encoded image data having the watermark data, wherein the source information comprises an electronic serial number (ESN) or a phone number of the mobile terminal obtaining the image.

2. The mobile terminal as recited in claim 1, further comprising:
an image data compressor to compress the encoded image data having the watermark data to generate compressed image data and to allow the compressed image data to be stored in the second storage.

3. A method for inserting watermark data into image data, the method comprising the steps of:
a) obtaining an image and converting the image into analog electric image data;
b) encoding the analog electric image data into digital image data and inserting watermark data into the digital image data to generate encoded image data; and
c) storing the encoded image data having the watermark data, wherein the watermark data includes source information, the source information comprising an electronic serial number (ESN) or a phone number of a mobile terminal obtaining the image.

4. The method as recited in claim 3, the method further comprising the step of:
d) compressing the encoded image data having the watermark data to generate compressed image data and storing the compressed image data.

* * * * *